May 26, 1936.  E. W. McCULLOUGH  2,042,429
PRODUCT FROM ORDINARY GARBAGE AND PROCESS OF PREPARING SAME
Filed March 10, 1924  4 Sheets-Sheet 1

INVENTOR.
ERVIN W. McCULLOUGH.
BY
ATTORNEYS.

Fig. 8

Patented May 26, 1936

2,042,429

UNITED STATES PATENT OFFICE 2,042,429

PRODUCT FROM ORDINARY GARBAGE AND PROCESS OF PREPARING SAME

Ervin W. McCullough, Indianapolis, Ind.

Application March 10, 1924, Serial No. 698,106

5 Claims. (Cl. 99—149)

This invention relates to the process of handling and treating garbage material produced by a city to secure therefrom useful products chiefly in the form of food products substantially devoid of all harmful agencies, which products have a higher commercial value than products heretofore recovered in processing garbage material, and which products it has not been possible to obtain by any other known commercially practicable process.

This invention is a continuation-in-part of a copending application, Serial No. 653,403, filed July 23, 1923, entitled "Garbage reducer". The present application is directed particularly to the processing of garbage material and the products resultant therefrom. The apparatus disclosed in the drawings, therefore, is merely diagrammatic of the several steps in process.

One object of the invention is to commercially process garbage material in a simple, orderly and thorough manner, which is more sanitary, quicker and more economical than has heretofore been possible. Said novel processing includes preparing the garbage material in a single unit, removing from said unit the prepared material in different readily treatable forms and thereafter subjecting said several forms of material to subsequent treatment which may be and preferably is wholly devoid of the use of chemical reagents.

Another object of the invention is to secure from the several forms of the prepared material useful products substantially devoid of harmful agencies and in a form heretofore unobtainable and for which there is a substantially universal market.

The feature of the invention consists in the sanitary, quick and economical production of products which have a high commercial value. Several of these resultant products have a high food and conditioning value. Likewise, they are palatable, have a pleasing odor, and can be very readily combined with cereal products for use as a food and which are substantially free from bacteria and poisons and are non-toxic, as well as substantially free from deleterious elements and harmful agencies, such as digestive tract perforators and lacerators.

Briefly, the process consists of loading a unit with city garbage material which may be and preferably is substantially drained of its free water content, adding thereto a small amount of clean water, and thereafter cooking under pressure the garbage material in said unit. After the material has been cooked to the desired degree, said cooking is discontinued, the pressure within the unit reduced, and the charge is permitted to settle. The aforesaid settling occurs progressively from the top toward the bottom. To expedite the substantial separation of the charge into its component parts, to-wit, the liquor and the solids components, the liquor in the top of the tank from which the solids have settled progressively is drawn off and conveyed to a suitable degreasing apparatus. This separation is continued until substantially the entire liquid content collected above the solids content in the unit has been removed from said unit.

The solids content in the unit is further drained following the decantation previously described; and the time necessary for said drainage is materially reduced by performing the same under pressure.

This liquor after passing through any suitable apparatus for removing the free grease therefrom, such as a baffle box, is conveyed to an evaporator which removes a considerable portion of the water content of said liquor and forms a molasses-like product. This product is then subjected to further dehydration by any suitable means which will produce a product; which, when cooled and under normal atmospheric conditions, is a brittle, taffy-like product. This product is substantially free from grease and contains less than ten per cent of moisture. It can be ground or pulverized in any suitable mill and is a product suitable for a conditioner or food, particularly for animals and fowls.

Following decantation and drainage, the solids content is agitated and dried preferably under a vacuum until the desired reduction in the moisture content is secured. The agitation of the solids during drying substantially completes the disintegration of the organic matter, such as food residues and the like. The disintegrated and dried solids content is then discharged from the unit. The disintegration occurs chiefly in the organic material included in the solids content. It is here noted that the cooking separation, decantation, drainage by pressure, drying under a vacuum and disintegration all takes place in the unit that received the charge as garbage material.

The disintegrated solids content, mechanically discharged from the unit by the action thereof, after cooling, is subjected to a separation process. Herein such a separation process is illustrated in two stages: The first stage consists of a coarse separation. This separates the main desirable constituent, chiefly disintegrated organic material, from the larger particles, such as large pieces of china, glass and tableware, peach seeds, cherry seeds, bottle caps and other usual household rubbish. The larger particle discard may then be ground and used as a fertilizer base, if desired. The discard may be subjected to a degreasing process whenever the grease content thereof is sufficient to commercially warrant further treatment.

The finer material or particles resulting from the aforesaid separation is then subjected to a further separation process which is multi-phase in character. This separation process is mechanical and pneumatic in character. The material removed by the pneumatic action is collected in any suitable manner and constitutes the chief constituent of the solids content of the charge. This material has a high food and conditioning value and is substantially free from glass and metallic matter. The glass content preferably being held to below 15/100 of 1 per cent. An intermediate separation occurs simultaneously with the aforesaid separation. The material separated by the intermediate separation consists principally of sand and similar very fine particles which also carry some of the desired product therewith.

The tailings from the aforesaid multi-phase separation can be reworked to remove therefrom the readily removable desired product that may have been carried over with the separated coarser particles or tailings during the aforesaid separation. If desired, the same tailings also may be reworked to remove the readily removable desired product therefrom.

Likewise either or both of these tailings may be subjected to a degreasing process when the grease content thereof renders such a process commercially advisable. The size and condition of the sand tailings is suitable for a fertilizer base without further treatment whatsoever. The other tailings may be ground, if necessary, and used for the same purpose.

The full nature of the invention will be understood from the accompanying drawings and the following description and claims:

Figures 1, 2, 3:
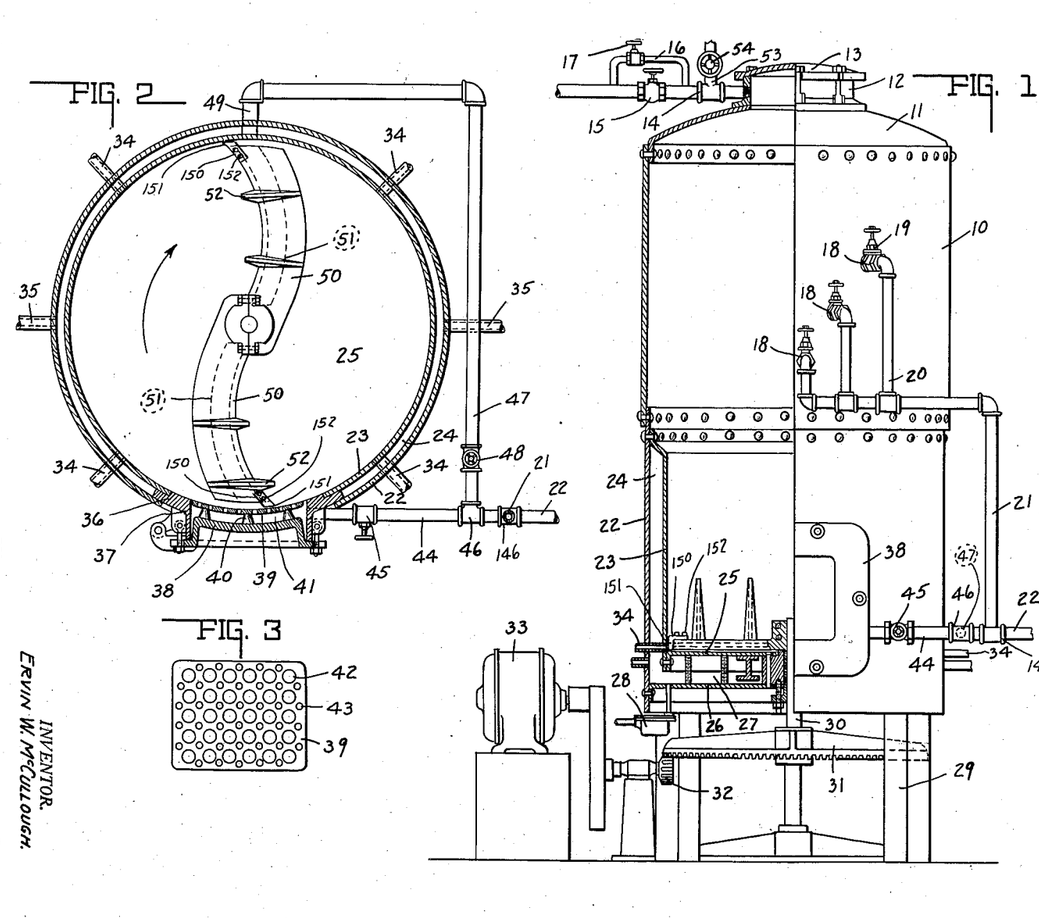
Fig. 1 is an elevational view of a tank or unit, parts being shown in section to show other parts in detail.
Fig. 2 is a transverse sectional view of the tank shown in Fig. 1 and is taken in a plane through the door.
Fig. 3 is an elevational view of the perforated plate supported by the door.

In Figs. 1, 2 and 3 there is illustrated one form of tank or unit adapted to receive a charge of ordinary garbage material collected in a city. The preferred construction of the apparatus includes a boiler shell 10 surmounted by a head 11 having a neck 12 closeable and sealable by a cover 13. Communicating with the neck is a pipe 14 controlled by a valve 15. By-passing said valve 15 is the by-pass 16 including a valve 17.

The shell 10 includes a plurality of outlets 18. These outlets preferably are arranged at different levels, and likewise preferably are arranged offset from each other. Each outlet 18 is controlled by a valve 19 which communicates with a pipe 20. All of the pipes 20 in turn communicate with a pipe 21 and which in turn with a pipe 22. The foregoing constitutes substantially the upper half of the tank or unit. The lower portion of the unit, and herein the same is shown substantially equal in height to the upper portion 10, is formed of a pair of concentric shells 22 and 23 forming an annular chamber 24 therebetween. The shell 23 includes a bottom 25 and the shell 22 includes a bottom 26, said bottoms being spaced from each other to form a space 27 which herein is shown in free communication with the annular space 24. Communicating with the chamber 27 and adapted to drain the same is a trap 28. The aforesaid construction is suitably supported by the standards 29 or equivalent means, and extending through the chamber 27 is a shaft 30 that terminates in an agitating construction positioned within and preferably near the lower portion of the lower chamber in the tank. The particular construction of this agitating element will be described hereinafter. Herein a conventional drive for the shaft 30 is shown and includes a gear wheel 31 driven by a pinion 32 in turn driven by a source of power, such as an electric motor 33.

At conveniently located points, and herein the same are shown in spaced and opposite relation about the periphery of the tank, there are provided conduits or pipes 34, which communicate with the interior of the shell 23 or lower chamber formed thereby. These pipes or conduits 34 are connected to a suitable source of steam supply and are adapted to discharge steam into the tank or unit for cooking purposes. Also there is provided a plurality of pipes or conduits 35 which herein are shown communicating with the chamber 24 formed within the shell 22 and between said shell and the inner shell 23. These pipes 35 are adapted to supply a heating medium such as steam to the chamber 24 for heating the contents of the chamber formed within the shell 23 or lower portion of the tank. The number of these pipes may be varied as found necessary or desirable. It is to be understood, of course, that the pipes 34 and 35 are suitably controlled by any control means such as valves or the like.

Positioned in the shells 22 and 23 is a door frame 36 provided with an opening 37 that permits access to be had from without the shell 22 to the interior of the shell 23. Suitably positioned in the opening 37 and suitably supported and secured adjacent thereto is a door 38. This door 38 does not conform to the inner periphery of the chamber or a continuation thereof of the shell 23, but is offset therefrom in the opening 37. There is provided, however, a plate 39 which herein is shown as forming substantially a continuation of the shell 23 and conforming to said periphery to form a complete circle therewith. Thus, no pocket is formed within the shell 23. The plate 39 is shown suitably supported by the lugs 40 which extend inwardly from the door or closure 38 and thereby form between the plate 39 and the door closure 38 and the enclosing walls of the opening 37 a chamber 41 having restricted communication with the chamber formed within the shell 23 at all times when the door is closed. The plate 39, see particularly Figs. 2 and 3, is shown provided with a suitable number of relatively large size apertures or holes 42 and the remainder of the plate portion is further apertured by a plurality of smaller apertures 43. The size of these apertures is such that the plate is adapted to restrain or support the contents positioned within the shell 23 and retain the same in said shell but permit restricted communication between the chamber formed within said shell and the chamber 41. The sizes and numbers of the perforations may be varied as found necessary or desirable.

A pipe 44 controlled by a valve 45 extends through the door frame 36 and communicates with the chamber 41 in turn having normally restricted communication with the interior of the shell 23. The pipe 44 is shown connected by a T 46 in turn connected by one branch to the pipe 22, and by another branch to a pipe 47, including a valve 48. The pipe 47 terminates in a conduit 49 that is positioned oppositely from the door opening 37, and said pipe 49 communicates with the chamber formed within the shell 23.

Extending radially from the axial center of the tank and positioned adjacent the bottom 25 thereof is a plurality of agitating arms 50. These arms 50 are curved and preferably are curved rearwardly with respect to the direction of rotation. Herein a pair of such arms is illustrated and these are positioned in opposite and spaced relation with respect to each other. The under face of each arm includes a channel 51 that extends from near the pivotal support thereof to the free end thereof, terminating relatively close to the shell 23. Each arm 50 supports one or more blades 52 which project upwardly from said arms. Herein there is illustrated a plurality of blades for each arm positioned in spaced relation with each other, so that they do not travel in the same path, but preferably in intermediate paths. These blades are shown tapering upwardly and forwardly to form an inclined front face. This inclination tends to keep the material from settling during the drying operation. Likewise the taper of the front face of the arms assists in the same operation. The passage of the blades through the material further disintegrates the readily reducible but not the rubbish material. The arms 50 are suitably connected to the shaft 30 for rotation thereby, and there is also provided suitable means associated with said connection, whereby a pressure and leak-proof bearing is secured. These arms are normally positioned as shown in Fig. 2 when stationary. Upon a rear corner of each arm is suitably secured by bolts 152 a cutter 150 having the cutting portion 151 for removing the caking material from the shell 23 which tends to insulate the latter.

Reference will again be had to the beforementioned first three figures and also Fig. 7 and the details of operation will be given hereinafter. The tank or unit is preferably supplied with a suitable quantity of clean cooking water. This water may be at any desired temperature, heated water being preferable, and the same may be supplied to the unit in any desired manner, such as by a hot water connection to the pipes 34.

Solely for reference, the following indication is given. The water supplied may lie substantially at the level of the top of the blades 52, but this amount of water may be varied within wide ranges, for the process has been utilized successfully without the addition of any water whatsoever. More uniform and desirable results have been secured with the utilization of some water. The garbage material preferably is drained of its free water content and is then admitted to the tank through the neck 12 thereof. The size of the charge may be varied as found necessary, but the amount thereof should not be so great as to interfere in the cooking operation with the venting of the tank through the pipes 14 and 16. Solely as an indication, it may be stated that the level of the charge is intermediate the lower level of the head 11 and the uppermost outlet 18. After the charge has been admitted and the cover 13 secured in place, steam or any other suitable medium is admitted through the pipes 34 to the chamber formed within the shell 23 and this heated medium passes upwardly through the charge and cooks the same. The pressure in the tank rapidly rises following the initiation of the process as is indicated by the chart in Fig. 7. Satisfactory cooking has been secured with a pressure of about 80 pounds per square inch, although other pressures may be utilized. During the cooking operation the charge boils and the relatively "cold" gases are driven off and are vented or blown off through the by-pass 16, the valve 15 being closed. Until a hot top or cover is secured cooking of the entire mass does not occur. The point $x$ on the chart indicates that this condition occurs in a relatively short time. When the charge is in this condition, substantially the greater portion of the "cold" gases have been discharged and the by-pass thereafter in certain classes of materials may be entirely closed; while in the other classes of materials it may be necessary to further utilize the same.

Cooking is thereafter continued under the desired pressure and temperature for a suitable period. The amount of the charge, the cooking temperature, pressure and the character of the material will all determine the length of the cooking interval. Cooking substantially ceases at the point "$y$" indicated on the chart, see Fig. 7, when the cooking medium is cut off from the tank by means of the controls included in the lines 34. Thereafter self-cooking may be permitted. However, generally the valve 15 is opened and pressure in the tank thereupon is released through the pipe 14, whereupon the pressure in the tank becomes substantially that of the atmosphere. This period is indicated by that portion of the chart shown in Fig. 7 and marked "blowoff". Cessation of ebullition is secured by cooling. Preferably, although not necessary, a suitable quantity of relatively cold water is admitted to both the top and bottom of the tank. The admission of this cold water expedites the cooling and hastens the settling and drainage action. This may be admitted in any suitable manner as through the cover 13 and pipe 14 and the pipes 34. Cessation of ebullition also may be expedited by the application of a vacuum.

Certain classes of materials may be more expeditiously cooked by the admission to the chamber 24 of a suitable heating medium. Such admission always initiates cooking more quickly following charging and prevents cold spotting in the charge. Also other forms of reducible refuse material may be more advantageously cooked by the sole use of the heating jacket.

Thereafter the charge settles and by gravity the solids content gradually collects in the lower portion of the tank and the liquor content of the charge collects thereabove. To expedite the removal of the separated liquor from the tank, and since such separation occurs progressively from the top toward the bottom of the charge, the uppermost outlet 18 is connected to the pipe 21 by opening the valve 19 controlling the former. The separated liquor above the level of the uppermost outlet 18 thereupon flows by gravity through the pipe 21 to a suitable collector unit. By the time that the separated liquor above the level of the uppermost outlet 18 has been removed from the tank, the liquor between said level and the level of the next lower outlet 18 will have become substantially separated from all of the solids content. The valve 19 controlling the latter outlet is thereupon opened and the separated liquor thereabove is likewise permitted to discharge to the same collector unit. This operation is repeated until the lowermost valve 19 has been opened and the separated liquor above the level of the same has been drained from the tank.

Following the aforesaid decantation, or simultaneously therewith, either or both of the valves 45 and 48 may be opened for draining the liquor in the bottom of the tank from the same into the same collector unit. When gravity drainage has been substantially completed and when necessary, all of the valves 19 are closed and pressure is applied through the line 14 by means of the pressure branch 53 controlled by the valve 54. This pressure is admitted gradually as indicated on the chart shown in Fig. 7 and the application of pressure gradually forces the liquor content not separated from the solids content by the previously described gravity separation, downwardly through the solids content and outwardly through the pipe 49 and the pipe 44 to the collector unit. Such separation is facilitated by the collection of the liquor in the bottom and its drainage to the aforesaid outlets through the channels 51 in the arms 50, which are so positioned that said channels readily communicate with the beforementioned outlets. It has been determined that substantially the entire pressure drainage previously described passes through the drainage plate 39. Following such pressing or pressure drainage, all valves controlling the lines communicating with the interior of the tank are closed except the valve 15 which controls the line 14, in turn connected to a vacuum line. Vacuum thereupon is applied to the contents of the tank, and substantially simultaneously therewith a heating medium is supplied to the chamber 24. Heat and vacuum thus applied to the solids content remaining in the tank dries the same. Simultaneously with this heating and drying, the arms 50 carrying the blades 52 are actuated to agitate the heating and drying solids content which further disintegrates the same and to insure that the drying is complete throughout the charge. When the charge has been properly cooked and properly dried, the organic material most desired, such as food residues and the like, will have been completely disintegrated, shredded and torn into small particles by the action of the agitator, while the undesirable material such as metals, glass, crockery, wood, rags, strings and the like will have been left in substantially the same condition, form and size as when placed in the unit, thus preparing the treated garbage or prepared tankage for subsequent operation. Following the aforesaid operation, the heating and vacuum are discontinued and the door 38 is opened, which removes simultaneously therewith the supporting plate 39 from the door opening 37. For safety purposes, the actuation of the arms 50 is discontinued while the door and plate are removed from the opening. After such removal, the arms are again actuated and rotation thereof automatically discharges the contents of the tank from the same.

Figure 4:
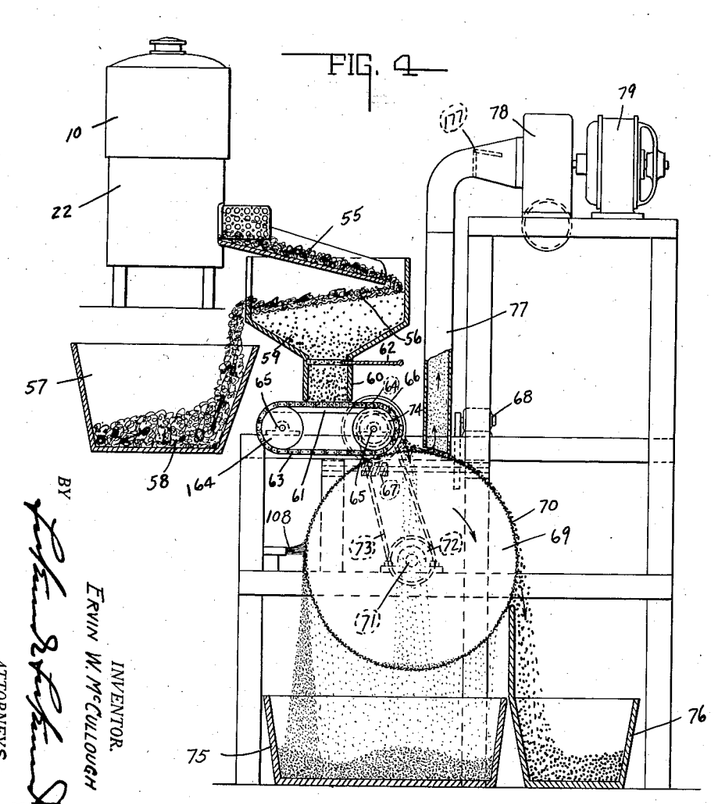
Fig. 4 is an elevational view of certain of the apparatus which illustrates one portion of the process, parts of said apparatus being shown in section to show other parts in detail.

Reference will now be had to Fig. 4 wherein the cooked, dried and disintegrated solids material is shown discharging from the opening into a chute 55 or any other suitable device for conveying said material to a separator. Herein such a separator is illustrated as of the conventional type and includes a separating surface, such as a screen 56. The material discharged upon the screen 56 is separated into two components, one of which is relatively large size, and, therefore, passes over said screen and discharges into any suitable container or receptacle 57. This discharge includes various materials in the form of larger particles, such as large pieces of china, glass and tableware, peach seeds, cherry seeds, bottle caps, tin cans and other usual household rubbish. This discharge 58 may be subjected to a degreasing process whenever the grease content is sufficient to commercially warrant such further treatment. If desired, the readily comminutable portion of this discharge 58, whether degreased or otherwise, may be ground and utilized as a fertilizer base. When this procedure is followed, it is preferable before grinding to separate from the discharge 58 the tableware and other similar larger articles, such as tin cans, etc.

The finer material or particles in the charge discharged upon the screen 56 by the conveyor 55 passes through said screen and collects in the hopper-like bottom 59. The hopper-like bottom discharges through a chute 60 to a conveyor platform 61. The discharge from the hopper to the platform is controlled by any suitable means such as a slide valve 62. This valve permits the mechanism hereinafter to be described to be repaired without having the contents of the hopper discharged upon the platform.

The measuring conveyor construction now to be described includes the conveyor platform 61 over which travels a plurality of parallel chains 63, which chains 63 support in spaced relation a plurality of transversely and parallel positioned carrier bars 64. These carrier bars are of a height substantially coinciding with the distance between the end of the chute 60 and the platform 61. Thus, only a predetermined amount of material can be conveyed by the chain and bar construction. The endless chains 63 are each associated with a plurality of sprocket wheels 164, which sprocket wheels are mounted upon shafts 65 one of which carries a worm wheel 66 driven by a worm 67, in turn driven by a suitable source of power such as an electric motor 68. Carrier bars 64 discharge the fine material separated by the screen 56 or any other suitable device upon a rotating drum 69 which has a screen or perforated surface 70. The discharge from the conveyor construction is such that the material first discharged downwardly by the upper bars 64 engages the lower bars 64 positioned therebeneath and is thus scattered over the periphery of the drum. Likewise, the aforesaid skeleton conveyor permits substantially all of the material conveyed thereby to be discharged upon the drum 69. It is to be understood that a considerable portion of this material is fibrous and fluffy-like, as well as slightly greasy, and will readily adhere to certain surfaces. The aforesaid open conveyor construction has been found to operate very satisfactorily, although other conveyor constructions may be and have been utilized.

The drum 69 is mounted on a shaft 71 which also carries a sprocket wheel 72 driven by a sprocket chain 73, in turn driven by a sprocket wheel 74 mounted on the shaft 65. Thus, the measuring conveyor and the drum operate in timed relation with each other. By reason of the fact that the drum rotates at a peripheral rate greater than the peripheral rate of travel of the conveyor, the material discharged by the conveyor upon the drum necessarily will be spread upon the surface of the same in a relatively thin layer. Such thin spreading of the material upon the perforated or screened surfaced drum permits the relatively heavy but fine particles, such as sand and similar very fine and similarly heavy particles to pass through the perforations or screen into the interior of the drum and thereafter pass outwardly therefrom and be collected into any suitable receptacle such as that indicated by the numeral 75 positioned beneath said drum. This is due entirely to gravity and the size of the perforations or of the screen mesh. The drum has operated satisfactorily when provided with a 28 mesh tin mill screen wire surface. The outward passage from the drum of the sand tailings or discharge maintains the screened surface relatively clear, since it removes from the outer surface thereof portions of the fluffy-like material which may have been carried around by the drum in its rotation. In addition thereto, it has been found that several small metallic articles, such as a few washers or nuts placed within the drum will agitate the lower surface thereof sufficiently to release any of the fluffy material which has been carried over by adhering to the drum surface. A brush 108 also insures complete clearing of the endless surface. Larger particles and those smaller particles which are relatively light are carried along by the drum in its rotation and are discharged into an adjacent receptacle 76 unless previously not separated by a pneumatic separator. An endless screen or perforated surface belt or conveyor has been utilized and may replace either the drum or the drum and conveyor construction, although the last mentioned construction has secured the most satisfactory results.

The tailings or discharge received by the receptacles 75 and 76 from any of the beforementioned devices may each or both be subjected to degreasing treatment should the grease content thereof commercially warrant the same. The sand tailings, which also include very small egg shell particles, metal filings and other material of similar character, are of suitable size so as to be readily adapted for use as a fertilizer base. The tailings or discharge carried over by the drum into the receptacle 76, if of sufficiently small size, may be similarly utilized or may be ground to a suitable size for such use. The tailings from either or both of the before mentioned separations may be reworked if the quantity of desirable fluffy-like constituent contained therein is sufficient to warrant such reworking.

The pneumatic separator construction previously referred to is shown including a suction conduit 77 which has a mouth terminating adjacent the upper portion of the drum periphery and in relatively close proximity thereto. A valve 177 in conduit 77 and near the upper end thereof controls the air and thereby the separation process. The revolving drum carries the thin layer of material under the open end of the suction pipe 77, and air drawn through the drum separates the finer material from the drum surface and carries it into the pipe 77 while the coarser material is carried over by the drum.

Figure 5:
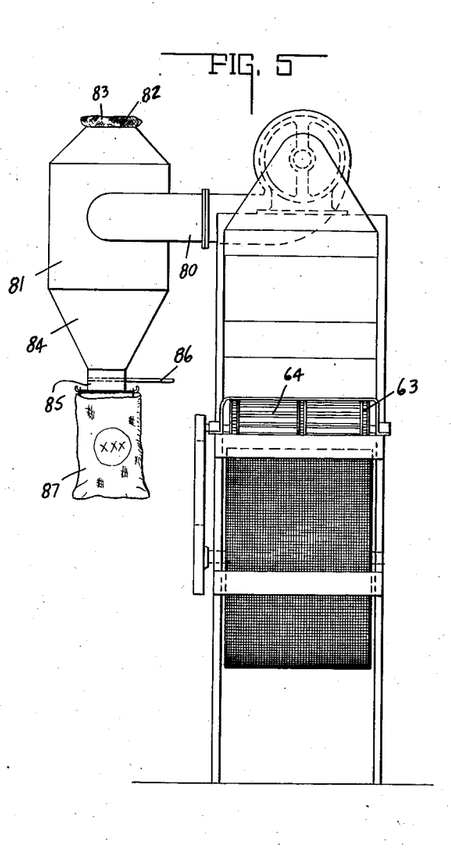
Fig. 5 is an elevational view taken at right angles to Fig. 4 of a portion of the apparatus shown therein and of additional apparatus used in the portion of the process which utilizes the apparatus shown in Fig. 4.

The pneumatic separator construction includes a fan within the housing 78 and operable by a suitable source of power, such as a motor 79. The housing 78 includes an inlet connected to the conduit 77 and a discharge 80. The discharge 80 is herein illustrated as discharging into a cyclone or a dust collector 81 having an air discharge 82 closed by a cloth or other suitable means 83 and provided with a hopper-like bottom 84. The bottom 84 discharges by means of a chute or mouth 85 controlled by a valve 86 into any suitable receptacle or means, such as a sack 87. The material discharged into the sack 87 is chiefly organic material, fluffy-like and fibrous in character, and which is substantially free from glass and metallic matter, the glass content preferably being held below 15/100 of one per cent controlling the pneumatic separation as aforesaid by the valve 177. This material has a high food and conditioning value and the specific character of the same will be referred to hereinafter more particularly.

Figures 6, 7:
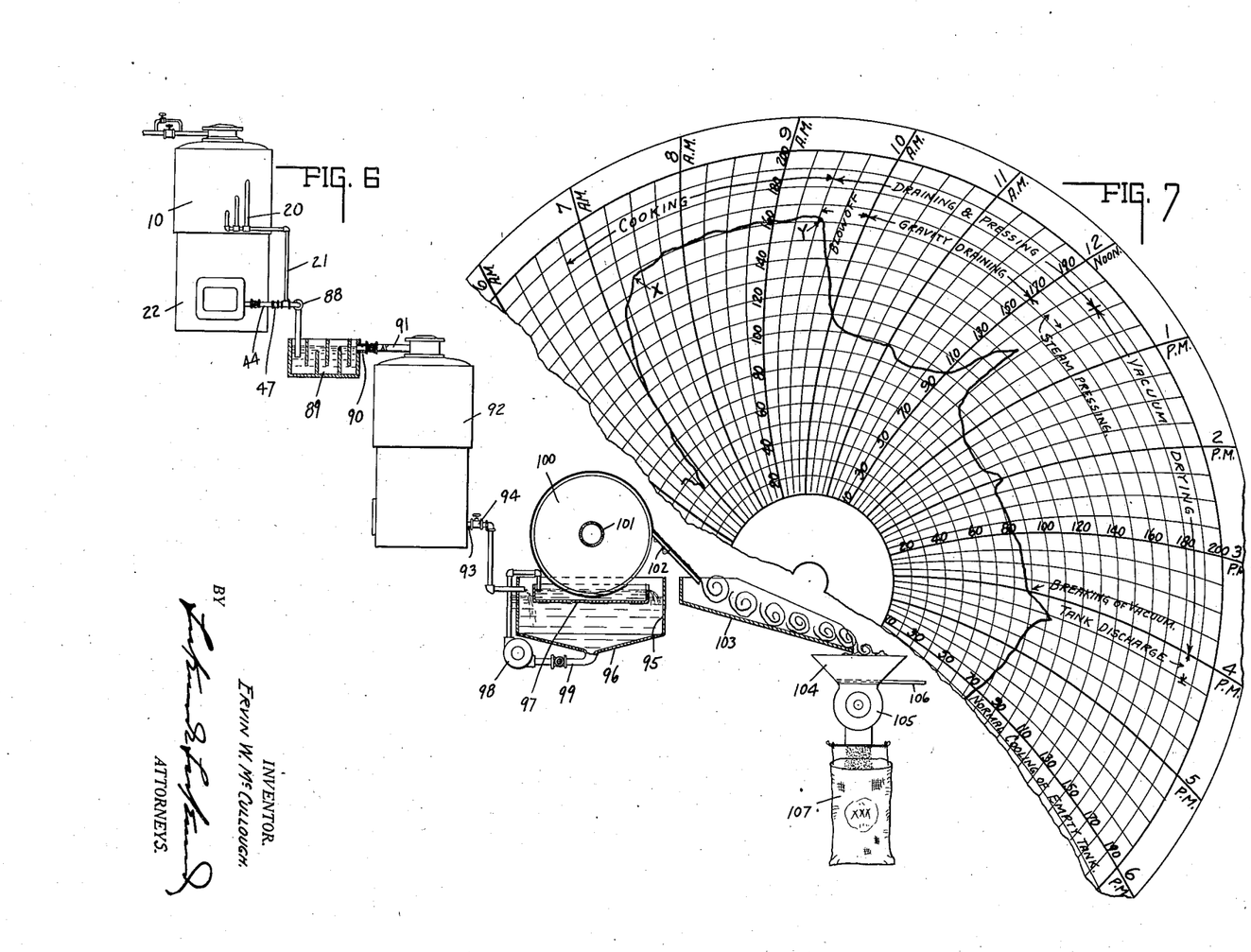
Fig. 6 is a diagrammatic view of an additional apparatus used in another portion of the process, parts being shown in section to show other parts in detail.
Fig. 7 is a typical time and temperature chart of that portion of the process which occurs in the unit shown in Figs. 1 and 2.
Figure 8:
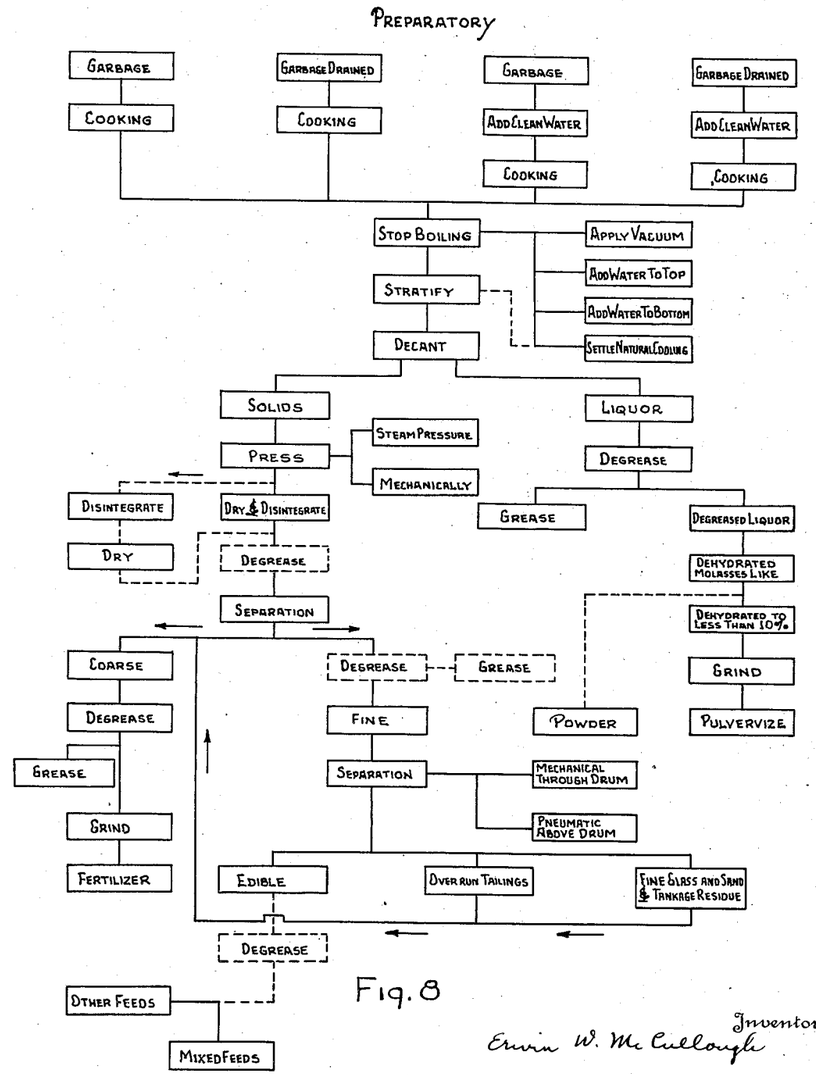
Fig. 8 is a flow sheet of the process.

Reference will now be had to Fig. 6. In this figure another portion of the process is illustrated. It will be recalled that there is decanted from the tank through the several conduits 20 discharging into the line 21 and drained from the tank through the conduits 44 and 47 the garbage liquor secured from the cooking process. Herein the pipe 21 and pipes 47 and 44 discharge into a header 88 which may also be connected to similar conduits of similar units. The header 88 discharges into a suitable degreasing apparatus which herein is shown in the form of a baffle box type grease separator 89 which discharges by suitable means through a conduit 90 into a conduit 91 discharging into an evaporator 92. The evaporator 92 is provided with an outlet 93 controlled by a valve 94. Any suitable evaporator or concentrator may be utilized, but one which is provided with a contents circulator or agitator is preferred. This evaporator, as its name indicates, is adapted to remove a considerable portion of the water content from the liquor. The resultant product is molasses-like in character and is discharged through the outlet 93 controlled by the valve 94. This molasses-like product includes a moisture content of approximately thirty to forty per cent.

The molasses-like product discharges into a suitable receptacle or container 95 herein shown provided with a hopper-like bottom 96. A tray 97 is also shown associated therewith, and herein a pump 98 is connected by a valve controlled line 99 with said tray 97 for maintaining a predetermined level of molasses-like product in said tray 97. Positioned adjacent, and herein above the tray 97 and with a portion of its periphery positioned therein, is a heated drying drum 100 having the heat supplying means 101 therein. A drum which has operated satisfactorily has had the following approximate dimensions, about 4 feet in diameter and about 12 feet in length, and this drum has a shell approximately an inch thick and is rotated at a speed of about 12 revolutions per hour. The foregoing figures are merely given for the purpose of description and are in no sense to be considered as limitations. Adjacent the surface of the drum is a plate 102 which is adapted to scrape from said surface the product which has been dried thereon. The material is, of course, hot when removed from the roll by the scraper and very closely resembles hot taffy candy. This material is permitted to cool and is conveyed by suitable means to a mill. Herein such a means illustrated includes the chute 103 and the hopper of the mill is indicated by 104; the mill proper being indicated by the numeral 105. A valve 106 controls the discharge from the hopper to the mill, and the discharge from the mill is adapted to be collected into a sack 107. The material when discharged from the roll and prior to grinding, when cool, is very brittle and resembles cold taffy candy. Under normal atmospheric conditions, it is relatively hygroscopic in character, and when exposed to the aforesaid conditions for several days will gradually reassume its relatively plastic form.

The immediately preceding parts of the specification have described one form of apparatus used in the several stages of the process. Reference is here made to the synopsis given in the fore part of the specifications for an understanding of the process in its entirety. Reference will now be had to a description of the products secured from the process.

The garbage liquor decanted and drained from the unit varies from a dark brown to a deep wine color, depending upon the original constituents in the garbage. The garbage, such as ordinarily secured from cities in the summertime is relatively low in animal content, although not necessarily so, for there may be an abundance or excess animal matter. The garbage in the winter normally has a higher animal content than in the summer, due to an increased meat consumption by the population. The grease separated from the liquor varies from a cream to a dark brown color and the molasses like product is usually very dark brown or almost black. The taffy-like product when ground may vary anywhere from a deep yellow to a light brown.

The moisture content of the products is less than ten per cent, while the protein content is comparatively high, which gives the products a high food value. The ash content, is in the neighborhood of ten per cent which indicates a favorable condition when it is noted that present practice in hog feeding indicates that hogs whose corn diet is supplemented with mineral mixtures gain weight more rapidly than those fed on a straight corn diet. The acidity, generally reported as lactic acid, is comparatively high. This is one of the conditioning factors in the product and may replace milk conditioning. The starch, dextrin and sugar content is comparatively high, indicating that the product has additional food and conditioning value. The ground or pulverized taffy-like product can be very easily mixed with cereal foods. It apparently has a very palatable taste and is very attractive to hogs, cows, horses and similar animals.

The solids content of the charge discharged from the tank is hot and the moisture content preferably is held to a maximum of ten per cent for it has been determined that when the moisture content exceeds this approximate figure, the keeping qualities of the product are not as good as when the moisture content is below ten per cent. The protein and fat contents of the fluffy-like product are higher and the crude fiber and ash contents lower than that of the dried garbage tankage. This result is brought about by separating the fluffy like material from the tailings. The comparatively high content of soluble hydrolyzable carbohydrates indicate that the fluffy-like material has a high food value. The acidity, generally reported as lactic acid, is one of the important conditioning properties contained in the food. Any figures, that might be given would only indicate the approximate changes that might be secured in the products. Likewise any set of figures furnished will indicate how the charge will vary at different times, this being due entirely to the fact that the eating habits of the population vary with the seasons, and, therefore, the garbage and refuse will similarly vary. The commercial success of the aforesaid process when only ordinary household garbage is utilized will be considerably greater when hotel and restaurant garbage with its high additional animal matter content is added. This addition will increase the grease yield recovery and give a higher food value to the products. It has been found that the protein content of the normal winter garbage is considerably higher, than that of the normal summer garbage, and thus the winter garbage contains a higher food value. This however, may not always be true, for the composition of the charge will be determined by the composition of the garbage, which may vary due to local conditions. The fluffy-like or finished product varies from a dark brown to a light brown in color, depending upon the moisture content and also the other constituents, and also the method of drying. When the drying occurs with the tank open headed, the color is darker than when the drying occurs under a vacuum. The material in either event has a fluffy appearance and also a fibrous appearance. This material is substantially free from metallics of all kinds, such as tacks, pins and filings, and is free from glass, china and similar products which are digestive tract perforators and lacerators, except that the same may be present in a minute form and in a percentage preferably less than 10/100, and, therefore, unobjectionable. The small percentage and the extremely small size of particles of the material included in said percentage insures that the product is ideal for food from a physical standpoint.

The new products, towit the taffy-like component secured from the liquor and fluffy-like product obtained by the pneumatic separation are substantially free from all household poisonous substances or toxic agents that may be present or develop in garbage. The acid reaction which these products invariably have indicates that the alkalies that may be present in household garbage, such as for example that resulting from the use of cleaning powders, have been neutralized and are no longer present in toxic form. The use of heat and vacuum in the drying completely eliminates arsenic or phosphorous that may be present in the garbage, due to the presence of rat poisons and the like. Volatile poisons, such as hydrocyanic acid resulting from metal cleaners and polishes will also be eliminated by the application of heat and suction in the drying process. The temperatures and pressures utilized in the process are such that the alkaloids, such as atropine and the like, are decomposed and are changed into a form that is not deleterious. Furthermore, the duration of cooking and the temperature and pressure at which the same takes place effectually disposes of all undesirable products of decomposition, so that the finished products, from a bacteriological and toxicological standpoint, are absolutely safe for feeding purposes.

As an indication of the food and conditioning value of the finished material, particularly that produced by the pneumatic separation, a satisfactory mixture fed to one flock of hens included bran, middlings, tankage or dried blood, and the fluffy-like product secured by the pneumatic separation. This flock was handled and fed in exactly the same manner as in former years. Therefore, no other reason except that resulting from the addition of the aforesaid product in the feed can be assigned for the resultant enormous increase in the egg production secured. It has been observed that the hens eat the mixtures containing the aforesaid product. They seem to like the product whether it be mixed with the mash, or without the mash. Its food value may be presumed to be at least equal to that of the mash.

The aforesaid product secured by the pneumatic separation has also been fed to domestic animals, such as hogs, cattle and horses and seems to be very palatable to them all. The fluffy-like product has been fed continuously to hogs for over a year and the following results have been attained thereby. Originally test hogs were fed the aforesaid product for two consecutive periods of a month each. The first period these hogs received nothing but the fluffy-like product and water. The hogs thrived and grew during this feeding period, which indicated conclusively that the fluffy-like product has a high food value, but their conditions indicated that the food was too concentrated and rich.

During the second month in addition to the aforesaid fluffy-like product and water, the hogs each were fed one ear of corn twice a day. When so fed a marked improvement in growth, weight and condition was noted although it appeared that this diet was still too rich and concentrated. After these two month's feeding had elapsed, 50% wheat shorts and oat middlings were added to the ration, which still further improved the feed and secured quicker and better fattening and conditioning results. The aforesaid feedings were made on fall pigs. Following this test which demonstrated the food and conditioning values of the product, the entire herd of brood sows was placed on the aforesaid mixture, which, however, gave the best results when the same was varied to include a mixture of 40% of the product and 60% of the regular grain feeds heretofore employed. Already eight or nine litters of pigs have been farrowed, and without exception the pigs farrowed have been uniform in size, well matured and developed and have possessed and displayed an unusual amount of vitality. This unusual increased development and vitality, as well as uniformity, can only be attributed to the improved ration which the aforesaid fluffy-like product secured by the pneumatic separation produces when mixed with the regular grain feeds. Likewise the feeding of this improved ration secured a marked improvement in the general condition of all of the animals. The fluffy-like product also has an elimination value. The particular herd of hogs which was fed this improved ration established a record which heretofore has never been attained by any individual herd and never by this herd heretofore. During the year 1923 the show portion of this herd was awarded in their class a big majority of the first prizes at the Ohio, Indiana, and Kentucky State fairs, as well as in the recent National Swine Show and the International Live Stock Exposition. The particular herd in question which was fed this improved ration for over a year was and is the Poland China herd at the Arlington Place Farm, Indianapolis, Indiana. The particular records referred to may be obtained from the official records of the various organizations mentioned.

From the foregoing, therefore, it will be apparent that the garbage obtained from a city can be mechanically processed in a sanitary manner to produce four resultant products, to-wit, the free grease, the taffy-like product which may be ground or pulverized, the tailings which may be utilized as a fertilizer base, and the fluffy-like product resulting from the pneumatic separation. The foregoing products, therefore, all are commercially useful and for which there is a universal demand. Since the food products can be sold comparatively cheap with respect to the usual prepared foods, these products can readily compete therewith.

The fluffy-like product secured by the pneumatic separation from properly processed charges has been stored in sacks and in piles, as well as in containers, and in each instance has shown substantially no deterioration or spoilage of any kind; and this can only be attributed to the fact that in the process substantially all of the bacteria have been killed. Also the bacteria normally present in the air have little or substantially no effect on this material over a comparatively long period of time.

While the invention has been described in great detail in the foregoing specifications, the same is to be considered solely as illustrative and not restrictive in character. Herein many modifications have been suggested and some of the same have been described in considerable detail, and all of these modifications, as well as the many which will suggest themselves to those skilled in the art to which this invention applies are all considered to be within the broad purview of this invention, reference being had to the appended claims.

The addition of water to the garbage undergoing treatment, or the draining of the liquid or water from the garbage prior to the treatments referred to, will depend to a large extent on the condition of the garbage. At certain seasons of the year there is sufficient water or liquid in the garbage so that none need be added. At other seasons of the year, the amount of liquor or water present in the garbage may be advantageously increased by the addition of water. As stated above, the addition of water or drainage of water or liquor from the garbage will depend entirely on the condition of the garbage. But it is to be understood that desirable results will be obtained in all cases when the garbage is treated directly by the processes disclosed, with or without the addition of water thereto, or with or without drainage of water or liquor therefrom. Preferably the garbage is drained and clean water added at all seasons of the year.

In the claims, where the expression "cooking with water" is used, it is intended to cover all cases of cooking garbage whether water is added to the garbage, or whether the garbage is cooked in the water or liquid which it contains without addition of further amounts of water, or whether the garbage is cooked in its remaining content of liquid or water after a portion of this liquid has been drained therefrom.

In the claims, the expression "edible" is intended to cover any material that is suitable or satisfactory for feeding purposes. In this case, the edible products produced, are not limited to use for feeding fowls and animals, but are also suitable for human consumption, although the fact that these products are derived from garbage raises a psychological factor that may militate against their use for human foods. However, insofar as their physical, chemical, physiological, and bacteriological conditions are concerned, these food products are well adapted and fitted for human consumption.

In the claims, the expression "city garbage" is intended to cover garbage as it is usually and generally collected in cities, containing besides animal and vegetable refuse, a large variety of other materials such as phonograph needles, metallics of other nature, egg shells, glass, china, safety razor blades and the like. In short, there is scarcely nothing that may not find its way into ordinary city garbage. It is in the treatment of such garbage material, that the present process admirably adapts itself, and produces therefrom valuable food products. Such "city garbage" differs essentially in its character for the reasons set forth herein, from garbage which is controlled at its source, such as hotel garbage, which is limited substantially to refuse food material.

The invention claimed is:

1. A garbage treatment process capable of commercial application including draining the ordinary run of city garbage, cooking the drained garbage by heat and steam, cooling the cooked garbage by adding clean cooling water thereto for stopping ebullition in the garbage and settling the same, decanting the supernatant grease and liquor from the cooked garbage, expressing from the cooked garbage the remaining portion of the free water content thereof and while stationary, and thereafter simultaneously agitating and mechanically disintegrating and drying the cooked garbage to substantial dryness to form a dried garbage tankage including a fluffy-like edible product, which process is characterized by the additional step of separating the cooked, dried and disintegrated garbage according to size, and then pneumatically separating the fluffy-like product from the fine remainder of the first separation.

2. A garbage treatment process capable of commercial application which includes cooking the ordinary run of city garbage to produce an edible component in the resultant tankage, treating said tankage to produce said edible component in a dried and mechanically separable form therein, and then subjecting said dried tankage to mechanical treatment for separating substantially only the edible component from the tankage.

3. A process as defined by claim 2, characterized by the treating of the garbage tankage to produce the edible component in the mechanically and readily separable form including the drying of the tankage without scorching the edible component or impairing its edibility to obtain stability thereof, and the separation of said component by mechanical treatment including a pneumatic separation to positively insure safety in the component.

4. The process of treating the ordinary run of city garbage to produce a safe, stable and edible product which includes cooking the city garbage to form tankage, drying the tankage without impairing its edibility or scorching the same and to a moisture content of less than ten percent for subsequent mechanical separation and substantially stable keeping qualities, and then subjecting such dried tankage to further treatment to simultaneously reduce the entire glass and china content to less than one tenth of one percent and that in minute form to insure safety and separate the edible product from the remaining tankage.

5. A garbage treatment process capable of commercial application which includes subjecting the ordinary run of city garbage to treatment including cooking and drying to form a relatively dry and disintegrated tankage, feeding this tankage in sheet form to an air passable sheet supporting surface, and pneumatically separating said tankage by passing air through the sheet to remove a portion of the tankage upon said surface.

ERVIN W. McCULLOUGH.